(12) United States Patent
Christensen

(10) Patent No.: US 8,662,510 B2
(45) Date of Patent: Mar. 4, 2014

(54) WHEEL SUSPENSION FOR WHEELED VEHICLES

(75) Inventor: Assar Christensen, Örnsköldsvik (SE)

(73) Assignee: BAE Systems Hägglunds Aktiebolag, Örnsköldsvik (SE)

( * ) Notice: Subject to any disclaimer, the term of this patent is extended or adjusted under 35 U.S.C. 154(b) by 75 days.

(21) Appl. No.: 13/125,043

(22) PCT Filed: Sep. 21, 2009

(86) PCT No.: PCT/SE2009/051042
§ 371 (c)(1),
(2), (4) Date: Jul. 1, 2011

(87) PCT Pub. No.: WO2010/047642
PCT Pub. Date: Apr. 29, 2010

(65) Prior Publication Data
US 2011/0254244 A1  Oct. 20, 2011

(30) Foreign Application Priority Data

Oct. 20, 2008  (SE) ..................................... 0802228

(51) Int. Cl.
*B60G 3/26* (2006.01)
(52) U.S. Cl.
USPC ....... 280/124.148; 280/124.134; 280/124.135
(58) Field of Classification Search
USPC ................... 280/124.134, 124.135, 124.136, 280/124.138, 124.139, 124.141, 86.75, 280/124.103, 124.106, 124.15, 124.11, 280/124.145, 5.52, 5.521, 124.148, 124.149
See application file for complete search history.

(56) References Cited

U.S. PATENT DOCUMENTS 3,958,654 A * 5/1976 LeSalver et al. .............. 180/291
3,983,951 A 10/1976 Guerra (Continued)

FOREIGN PATENT DOCUMENTS

CN  101272923 A  9/2008
EP  0506141 A1  9/1992

(Continued)

OTHER PUBLICATIONS

Unknown Inventor (Applicant is Citroen SA), Road vehicle suspension system utilises flexible hose under tension containing fluid at high pressure, Aug. 5, 1977, France, FR 2 334 020 A1, Machine Translation of Description.*

(Continued)

*Primary Examiner* — James English
(74) *Attorney, Agent, or Firm* — Morrison & Foerster LLP

(57) ABSTRACT

Wheel suspension for a wheeled vehicle, with a lower rocking lever (12) with an inner end being movably connected to a vehicle frame (14) via a lower arm part (16) of a double armed rocker (18) which is pivotable about a substantially horizontal axle (20) in the vehicle frame, and with an outer end being articulately attached to a lower part of a wheel hub (24), and an upper support arm (28) with an outer end being articulately attached to an upper end of the wheel hub (24), and with an inner end, being articulately connected to the vehicle frame (14). The upper support arm (28) is connected to an upper arm part (34) of the double armed rocker (18) via a coupling link (36), which is articulately connected to the upper support arm (28) as well as the upper arm part (34) of the double armed rocker (18), wherein the lower rocking lever (12) has an inclination obliquely downwardly outwardly from the vehicle frame (14) in a neutral position of the wheel hub (24). A hydro-pneumatically combined spring acting and damping member (42), which comprises a hydraulic piston-cylinder device (44) and a gas spring (50) communicating therewith via restriction members is with its cylinder articulately connected to the vehicle frame (14), while the outer end of the piston stem (48) of the piston-cylinder device is articulately connected to the upper support arm (28).

12 Claims, 2 Drawing Sheets

(56) References Cited

U.S. PATENT DOCUMENTS

| | | | |
|---|---|---|---|
| 5,284,353 | A | 2/1994 | Shinji et al. |
| 5,451,073 | A | 9/1995 | Inoue |
| 5,498,019 | A | 3/1996 | Adato |
| 6,467,783 | B1 * | 10/2002 | Blondelet et al. ...... 280/124.106 |
| 6,746,032 | B2 * | 6/2004 | Seki ........................ 280/124.135 |
| 7,246,806 | B2 * | 7/2007 | Andre et al. ............ 280/124.106 |
| 7,392,978 | B2 * | 7/2008 | Carlitz et al. .................. 267/221 |
| 2002/0109327 | A1 * | 8/2002 | Timoney et al. ........ 280/124.135 |
| 2008/0025841 | A1 | 1/2008 | Norton et al. |
| 2008/0258418 | A1 * | 10/2008 | Christensen ........... 280/124.116 |

FOREIGN PATENT DOCUMENTS

| | | |
|---|---|---|
| EP | 1977915 A1 | 10/2008 |
| FR | 2334020 A1 | 7/1977 |
| JP | 63-265709 A | 11/1988 |
| JP | 64-56216 A | 3/1989 |
| JP | 3-279010 A | 12/1991 |
| JP | 8-156548 A | 6/1996 |
| SE | 531036 C2 | 11/2008 |
| SE | 532590 C2 | 3/2010 |
| WO | 94/12359 A1 | 6/1994 |

OTHER PUBLICATIONS

International Search Report and Written Opinion received for PCT Patent Application No. PCT/SE2009/051042, mailed on Jan. 13, 2010, 9 pages.

Extended European Search Report received for European Patent Application No. 09822267.2, mailed on Feb. 22, 2012, 6 pages.

Office Action received for Chinese Patent Application No. 200980141674.0, mailed on Oct. 29, 2012, 9 pages. (5 pages of English Translation and 4 pages of Official Copy).

Search Report received for Chinese Patent Application No. 200980141674.0, mailed on Oct. 20, 2012, 2 pages.

Office Action received for Chinese Patent Application No. 200980141674.0, mailed on May 20, 2013, 13 pages (7 pages of English Translation and 6 pages of Official Copy).

International Preliminary Report on Patentability received for PCT Patent Application No. PCT/SE2009/051042, mailed on May 5, 2011, 6 pages.

Search and Examination Report received for Singapore Patent Application No. 201102587-1, mailed on Feb. 12, 2013, 10 pages.

* cited by examiner

US 8,662,510 B2

WHEEL SUSPENSION FOR WHEELED VEHICLES

CROSS REFERENCE TO RELATED APPLICATIONS

This application is a U.S. National Phase patent application of PCT/SE2009/051042, filed Sep. 21, 2009, which claims priority to Swedish patent application Serial No. 0802228-7, filed Oct. 20, 2008, all of which are hereby incorporated by reference in the present disclosure in their entirety.

TECHNICAL FIELD

The present invention relates to a wheel suspension for wheeled vehicles according to the preamble of claim 1. Such a wheel suspension is known through SE 0700818-8. Particularly, but not exclusively, the invention relates to such a wheel suspension for relatively large and heavy vehicles, in which high belly clearance is desirable as well as minimal track gauge changes during inward and outward spring actions of the wheel suspensions. The wheel suspension according to the invention is usable on steerable as well as non-steerable wheels and driven and non-driven wheels.

BACKGROUND ART

Wheel suspensions of vehicles are normally provided with spring action devices and damping devices in order to improve comfort and driving ability of the vehicle. A MacPherson spring leg is a common type of such a device, in which a compressible screw spring surrounds a hollow tube leg containing a hydraulic damping cylinder. Alternatively the screw spring may be separately arranged relative to the damping cylinder.

Also combined, so called hydro-pneumatic spring and damping devices have been suggested. For example the not pre-published Swedish patent application 0702481-3 describes different embodiments of hydro-pneumatic spring and damping devices, which are devised in such a way that inward spring action and outward spring action of the wheel suspensions may be controlled in a desired manner in order to e.g. improve driving ability of the vehicle, as the vehicle is subjected to heeling and kneeling movements during drive on road and in terrain.

In known wheel suspensions with spring action devices or damping devices of the above mentioned type the damping cylinder is normally mounted in such a way that the piston is pressed into the cylinder during inward spring action of the wheel undercarriage and is expressed out of the cylinder during outward spring action. This results in increased buckling and bending strain of the piston and increased ware and shorter life expectancy on sealings belonging thereto.

A wheel suspension is known from JP 8-156548, in which a damping cylinder indeed is mounted in such a way between an upper supporting arm and a lower fixed frame part that the piston is expressed from the cylinder during inward spring action of the wheel undercarriage and is pressed into the cylinder during outward spring action. This wheel suspension needs to be supplemented by a separate mechanical spring device and has, due to the attachment of the cylinder in the upper supporting arm, a higher unsprung mass, which requires more energy in order to damp the unsprung mass, whereby the damper becomes warmer due to kinetic energy from the wheel being converted to heat by the restrictions in the damper. Also, its linked arm system does not facilitate high belly clearance of the vehicle or minimizes the track gauge changes during inward and outward spring actions or results in comfort properties which a hydro-pneumatic spring leg may provide.

SUMMARY OF THE INVENTION

An object of the present invention is to suggest an improved wheel suspension, which apart from facilitating high belly clearance and having minimized track gauge changes during inward and outward spring actions of the wheel undercarriage also shall provide improved comfort and driving abilities during simultaneous reduction of buckling and bending strains of the piston with less ware and longer life expectancy on sealings belonging to the hydraulic damping cylinder, and reduced unsprung weight.

For this object the invention emanates from a wheel suspension of the type known through SE 0700818-8, wherein the wheel suspension according to the invention is distinguished by the features in the characterising portion of claim 1. Thus, the wheel suspension has a hydro-pneumatic, combined spring- and damping member, comprising a hydraulic piston-cylinder device and a gas spring communicating with this via constriction members, and which is articulately connected to the frame of the vehicle, while the outer end of the piston stem of the piston-cylinder device is articulately connected to the upper supporting arm, wherein the damping cylinder acts pullingly in the course of inward spring actions of the wheel undercarriage and a smaller unsprung mass than what is the case when the cylinder is fixed to the upper arm of the piston stem in a frame-fixed part is achieved.

It is suitable that the cylinder of the piston-cylinder device is articulately journalled on a shaft, which is coaxial to the horizontal pivot axel for the rocker.

Further features and advantages of the invention will be apparent from the following description of an embodiment of the wheel suspension according to the invention with reference to the enclosed drawings.

DETAILED DESCRIPTION

Figure 2:
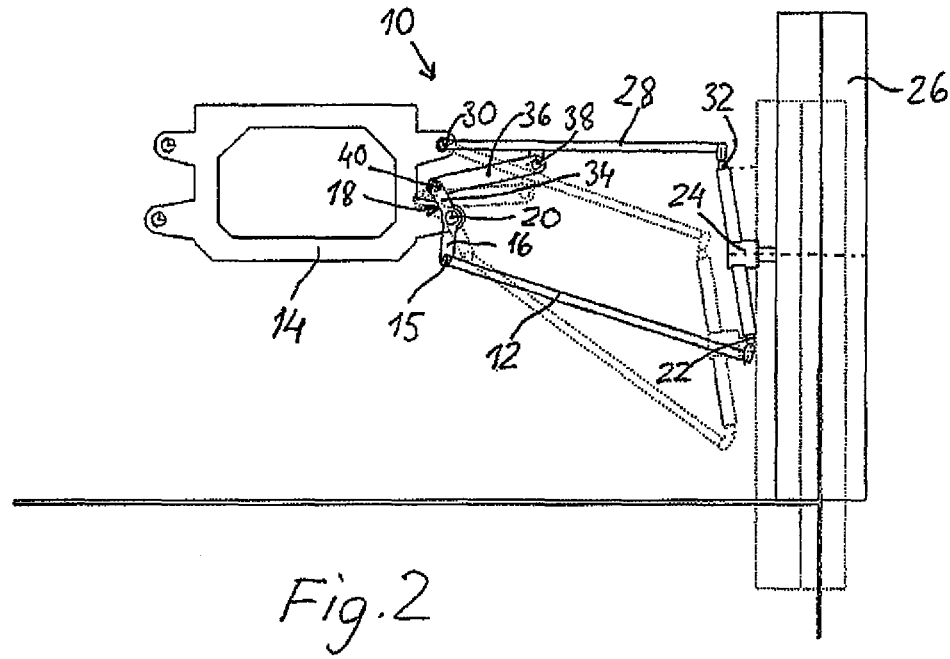
FIG. 2 schematically shows a side view of the wheel suspension in FIG. 1, again with continuous lines in a neutral position and with dotted lines in an expressed state of the wheel.
Figure 1:
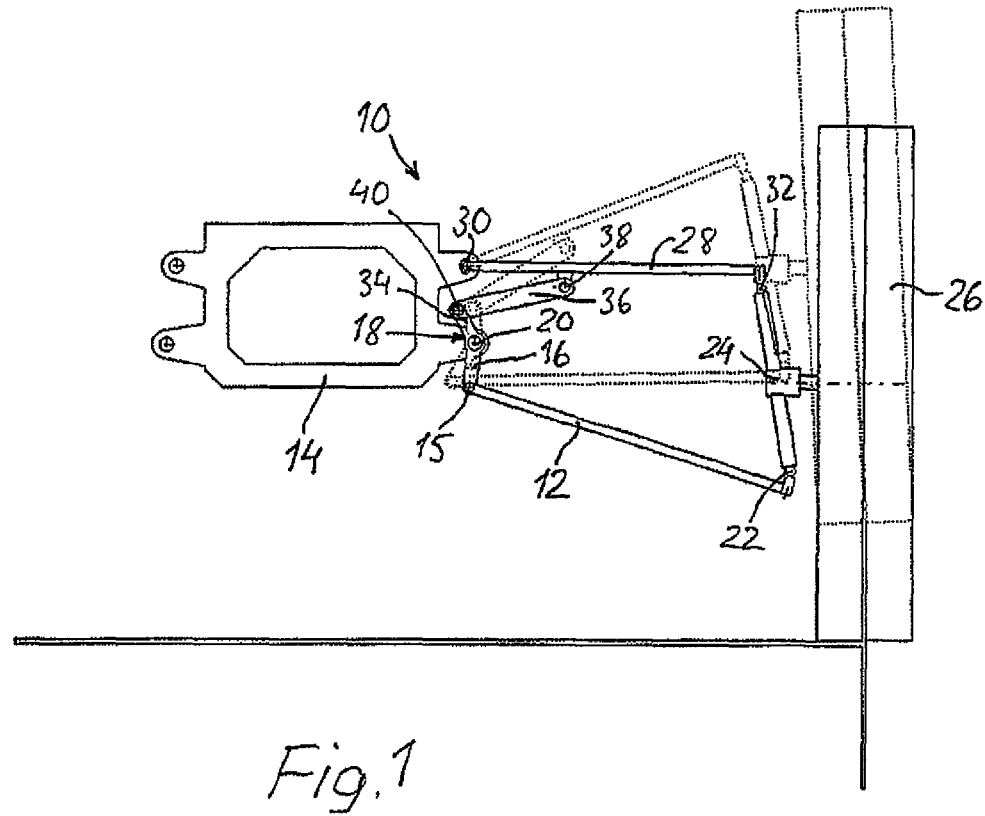
FIG. 1 schematically shows an embodiment of a wheel suspension, shown with continuous lines in a neutral position and with dotted lines in an impressed state of the wheel but without a hydro-pneumatic damping and spring acting member according to the invention.

In FIGS. 1 and 2 an embodiment of the wheel suspension for a wheeled vehicle is generally denoted with 10. The wheel suspension 10 comprises a lower rocking lever 12, which is pivotably and displacably journalled relative to a fixed vehicle frame 14 by being articulately connected at 15 with a lower arm part 16 of a two-armed, track gauge compensating rocker 18, which is substantially vertically oriented and pivotably journalled about a shaft 20 in the frame 14. The outer end of the rocking lever 12 is articulately connected to a lower part of a wheel hub 24, which rotatably supports a wheel 26. The wheel suspension 10 further comprises an upper rocking lever formed as an upper support arm 28, which at its inner end is pivotably journalled in the vehicle frame 14 above a shaft 30 and is articulately connected at 32 with an upper part of the hub 24 of the wheel at its outer end. The upper support arm 28 in turn is connected to an upper arm part 34 of the rocker 18 by means of a coupling link 36, which is articulately connected at 38 with the support arm 25 and at 40 with the upper arm part 34 of the rocker 18.

In the neutral position of the wheel suspension shown with continuous lines the lover rocking lever 12 has an inclination obliquely downwardly and outwardly and is formed substantially longer than the upper support arm 28 in order to hereby allow a relatively high ground clearance of the vehicle. Seen in plan view the lower arm 12 and upper arm 28 may respectively have a substantially A-shaped profile, where the lower rocking lever 12 has joints 15 in a respective lower arm part of two parallel rockers 18.

As is evident from the dotted lines in FIG. 1, the upper support arm 28 will during an inward spring action of the wheel hub 24 and wheel 26, e.g. by bumping into a bump on the road, during its turn about the axle 30 via the coupling link 36 swing the rocker 18 clockwise about the bearing axle 20 in the vehicle frame 14, wherein the lower arm part 16 of the rocker 18 simultaneously pulls the lower rocking lever 12 inwardly towards the vehicle frame 14 in such a way that the wheel 26 during its lifting mainly maintains its track gauge instead of increasing it, which otherwise would occur if the compensating rocker 18 was not present.

Inversely the upper support arm 28 will be turned downwardly during outward spring action of the wheel 26 from the neutral position, as shown with dotted lines in FIG. 2, wherein the coupling link 36 will press the upper arm portion of the rocker 18 inwardly, i.e. turn this in a counter clockwise direction in such a way that the lower rocking lever 12 is pressed outwardly from the vehicle frame 14. Hereby the lower part of the wheel is brought outwardly during its descending movement in order to, to a considerable degree, compensate for (reduce) the track gauge reduction which otherwise would occur if the compensating rocker 18 was not present.

Figure 3:
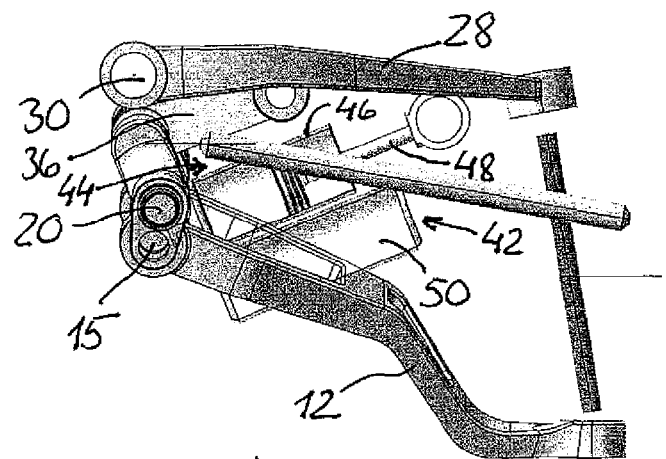
FIG. 3 schematically shows a side view of the wheel suspension in FIG. 1 with a hydro-pneumatic damping and spring acting member in a neutral position.
Figure 4:
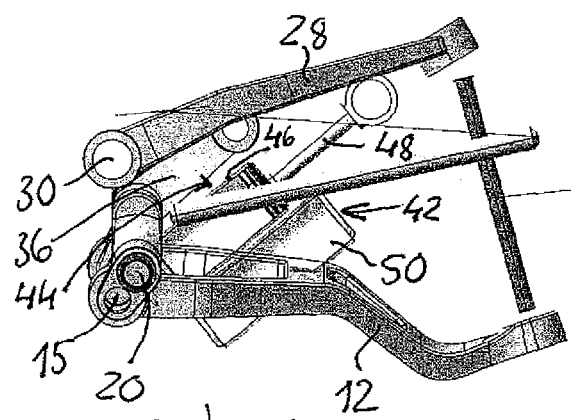
FIG. 4 schematically shows a side view of the wheel suspension in FIG. 1 with a hydro-pneumatic damping and spring acting member in an impressed state.
Figure 5:
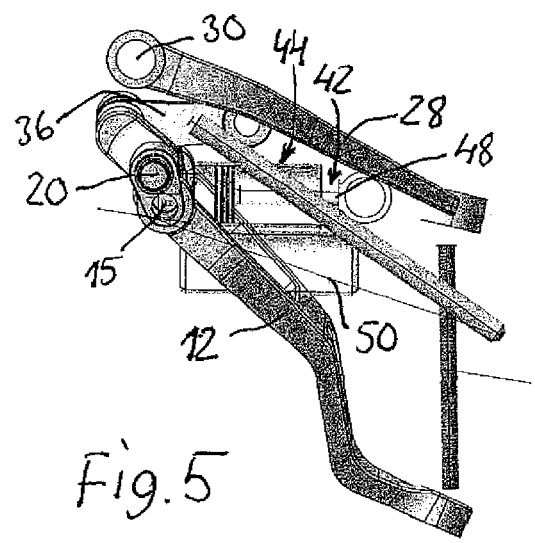
FIG. 5 schematically shows a side view of the wheel suspension in FIG. 1 with a hydro-pneumatic damping and spring acting member in an expressed state.

In FIG. 3-5 a wheel suspension according to FIGS. 1 and 2 is schematically shown, provided with a hydro-pneumatic damping and spring acting member 42, in the different spring acting states neutral position, impressed position and expressed position, respectively. This damping and spring acting member comprises in a per se known way a hydraulic piston-cylinder unit 44 with a hydraulic cylinder 46 and a piston stem 48 displacably journalled therein, and a gas-hydraulic spring 50 communicating with the cylinder 46 via at least one, controllable throttle valve, not shown, said spring 50 preferably being semi-detached to one side of the cylinder 46 for building of a compact unit. The outer end of the piston stem 48 is articulately connected to the vehicle frame 14 over a horizontal axle, which may be coaxial to the link axle 20 for the rocker 18. By such an engagement of the hydro-pneumatic damping and spring acting member 42 with the link arm system of the wheel suspension not only a high belly clearance and minimized track gauge changes during inward and outward spring action of the wheel undercarriage and enhanced comfort and driving abilities is achieved but also reduced buckling and bending strains on the piston stem 48 and less ware and longer life expectancy on thereto belonging sealings in the hydraulic damping cylinder thanks to the pulling piston movement during the inward spring action movement of the wheel undercarriage, at the same time as the unsprung weight is reduced.

The invention claimed is:

1. A wheel suspension for a wheeled vehicle comprising:
   a lower, wheel supporting rocking lever with an inner end being movably connected to a vehicle frame via a lower arm part of a double armed rocker which is pivotable about a substantially horizontal axle in the vehicle frame, and with an outer end being articulately attached to a lower part of a wheel hub;
   an upper support arm with an outer end being articulately attached to an upper end of the wheel hub, and with an inner end, being articulately connected to the vehicle frame, wherein the upper support arm is connected to an upper arm part of the double armed rocker via a coupling link, which is articulately connected to the upper support arm as well as the upper arm part of the double armed rocker, wherein the lower rocking lever has an inclination obliquely downwardly outwardly from the vehicle frame in a neutral position of the wheel hub; and
   a hydro-pneumatically combined spring acting and damping member, which comprises a hydraulic piston-cylinder device and a gas spring coupled to the piston-cylinder device, wherein a cylinder of the piston-cylinder device is articulately connected to the vehicle frame, while the outer end of a piston stem of the piston-cylinder device is articulately connected to the upper support arm, and wherein the piston stem of the piston-cylinder device is arranged so as to be pulled out of the cylinder of the piston-cylinder device in an impressed position of the wheel hub.

2. The wheel suspension device according to claim 1, wherein the cylinder of the piston-cylinder device is articulately attached to an axle which is coaxial to the horizontal pivot axle for the rocker.

3. The wheel suspension according to claim 1, wherein an inner end of the upper support arm is formed to be articulately attached in the vehicle frame and extend substantially horizontally to an upper, flexible attachment point of the wheel hub in a neutral position thereof.

4. The wheel suspension according to claim 3, wherein the upper support arm is shorter than the lower rocking lever.

5. The wheel suspension according to claim 1, wherein the pivot axle of the rocker in the vehicle frame lies substantially vertical under the upper attachment point of the upper support arm in the frame.

6. The wheel suspension according to claim 1, wherein the lower rocking lever and the upper support arm are substantially A-shaped in plan view.

7. The wheel suspension according to claim 2, wherein an inner end of the upper support arm is formed to be articulately attached in the vehicle frame and extend substantially horizontally to an upper, flexible attachment point of the wheel hub in a neutral position thereof.

8. The wheel suspension according to claim 3, wherein the upper support arm is shorter than the lower rocking lever.

9. The wheel suspension according to claim 7, wherein the upper support arm is shorter than the lower rocking lever.

10. The wheel suspension according to claim 2, wherein the pivot axle of the rocker in the vehicle frame lies substantially vertical under the upper attachment point of the upper support arm in the frame.

11. The wheel suspension according to claim 9, wherein the pivot axle of the rocker in the vehicle frame lies substantially vertical under the upper attachment point of the upper support arm in the frame.

12. The wheel suspension according to claim 11, wherein the lower rocking lever and the upper support arm are substantially A-shaped in plan view.

\* \* \* \* \*